(12) United States Patent
Edwards et al.

(10) Patent No.: US 6,615,370 B1
(45) Date of Patent: Sep. 2, 2003

(54) CIRCUIT FOR STORING TRACE INFORMATION

(75) Inventors: David Alan Edwards, Bristol (GB); Anthony Willis Rich, Cambridge (NZ)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/410,560

(22) Filed: Oct. 1, 1999

(51) Int. Cl.⁷ .............................................. G06F 11/00
(52) U.S. Cl. ...................................................... 714/45
(58) Field of Search ............................ 714/45, 46, 48, 714/30, 31, 32, 34, 35, 25, 26

(56) References Cited

U.S. PATENT DOCUMENTS

| | | | |
|---|---|---|---|
| 4,814,981 A | 3/1989 | Rubinfeld | 364/200 |
| 5,251,311 A | 10/1993 | Kasai | 395/425 |
| 5,355,487 A | 10/1994 | Keller et al. | |
| 5,386,565 A | 1/1995 | Tanaka et al. | 395/700 |
| 5,423,050 A | 6/1995 | Taylor et al. | 395/575 |
| 5,434,804 A | 7/1995 | Bock et al. | 364/579 |
| 5,440,705 A | 8/1995 | Wang et al. | 395/421.1 |
| 5,448,576 A | 9/1995 | Russell | 371/22.3 |
| 5,452,432 A | 9/1995 | Macachor | 395/425 |
| 5,455,936 A | 10/1995 | Maemura | 395/183.11 |
| 5,479,652 A | 12/1995 | Dreyer et al. | 395/183.06 |
| 5,483,518 A | 1/1996 | Whetsel | 370/13 |
| 5,488,688 A | 1/1996 | Gonzales et al. | 395/183.1 |
| 5,530,965 A | 6/1996 | Kawasaki et al. | 395/800 |
| 5,570,375 A | 10/1996 | Tsai et al. | 371/22.3 |
| 5,590,354 A | 12/1996 | Klapproth et al. | 395/800 |
| 5,596,734 A | 1/1997 | Ferra | 395/825 |
| 5,598,551 A | 1/1997 | Barajas et al. | 395/484 |
| 5,608,881 A | 3/1997 | Masumura et al. | 395/306 |
| 5,613,153 A | 3/1997 | Arimilli et al. | 395/821 |

(List continued on next page.)

FOREIGN PATENT DOCUMENTS

| | | |
|---|---|---|
| EP | 0165 600 B1 | 12/1985 |
| EP | 0 165 660 A2 | 12/1985 |
| EP | 0 636 976 B1 | 2/1995 |
| EP | 0 636 976 A1 | 2/1995 |
| EP | 0 652 516 A1 | 5/1995 |
| EP | 0702 239 A3 | 3/1996 |
| EP | 0 702 239 A2 | 3/1996 |
| EP | 0 720 092 A1 | 7/1996 |
| EP | 0 933 926 A1 | 8/1999 |
| EP | 0 945 805 A1 | 9/1999 |
| EP | 0 959 411 A1 | 11/1999 |
| JP | 8320796 A | 12/1996 |
| JP | 8329687 A | 12/1996 |
| JP | 9212358 A | 8/1997 |
| JP | 9311786 A | 12/1997 |

(List continued on next page.)

OTHER PUBLICATIONS

York, Richard et al. "Real Time Debug for System–on–Chip Devices", Jun., 1999.

Primary Examiner—Nadeem Iqbal
(74) Attorney, Agent, or Firm—Townsend and Townsend and Crew LLP

(57) ABSTRACT

A system for performing non-intrusive trace is provided which receives trace information from one or more processors. The trace system may be configured by a user to operate in various modes for flexibly storing or transmitting the trace information. The trace system includes a FIFO which is memory-mapped and is capable of being accessed without affecting processor performance. In one aspect, the trace system includes a trace buffer which receives trace information at an internal clock speed of the processor. In another embodiment, a compression protocol is provided for compressing trace messages on-chip prior to transmitting the messages to an external system or storing the messages in memory.

26 Claims, 11 Drawing Sheets

U.S. PATENT DOCUMENTS

| | | | | |
|---|---|---|---|---|
| 5,627,842 A | | 5/1997 | Brown et al. | 371/22.3 |
| 5,657,273 A | | 8/1997 | Ayukawa et al. | 365/189.01 |
| 5,659,679 A | | 8/1997 | Alpert et al. | |
| 5,682,545 A | | 10/1997 | Kawasaki et al. | 395/800 |
| 5,704,034 A | | 12/1997 | Circello | 395/183.14 |
| 5,708,773 A | | 1/1998 | Jeppesen, III et al. | 395/183.06 |
| 5,724,505 A | * | 3/1998 | Argade et al. | 395/183.21 |
| 5,724,549 A | | 3/1998 | Selgas et al. | 395/468 |
| 5,737,516 A | | 4/1998 | Circello et al. | 395/183.14 |
| 5,751,621 A | | 5/1998 | Arakawa | 364/748.07 |
| 5,768,152 A | | 6/1998 | Battaline et al. | 364/551.01 |
| 5,771,240 A | | 6/1998 | Tobin et al. | 371/22.1 |
| 5,774,701 A | | 6/1998 | Matsui et al. | 395/556 |
| 5,778,237 A | | 7/1998 | Yamamoto et al. | 395/750.04 |
| 5,781,558 A | | 7/1998 | Inglis et al. | 371/21.1 |
| 5,796,978 A | | 8/1998 | Yoshioka et al. | 395/416 |
| 5,809,293 A | * | 9/1998 | Bridges et al. | 395/568 |
| 5,828,825 A | | 10/1998 | Eskandari et al. | 395/183.03 |
| 5,832,248 A | | 11/1998 | Kishi et al. | 395/376 |
| 5,835,963 A | | 11/1998 | Yoshioka et al. | 711/207 |
| 5,848,247 A | | 12/1998 | Matsui et al. | 395/284 |
| 5,848,264 A | * | 12/1998 | Baird et al. | 395/500 |
| 5,860,127 A | | 1/1999 | Shimazaki et al. | 711/167 |
| 5,862,387 A | | 1/1999 | Songer et al. | 395/728 |
| 5,867,726 A | | 2/1999 | Ohsuga et al. | 395/800.32 |
| 5,884,092 A | | 3/1999 | Kiuchi et al. | 395/800.35 |
| 5,896,550 A | | 4/1999 | Wehunt et al. | 395/846 |
| 5,918,045 A | | 6/1999 | Nishii et al. | 395/584 |
| 5,930,523 A | | 7/1999 | Kawasaki et al. | 395/800.32 |
| 5,930,833 A | | 7/1999 | Yoshioka et al. | 711/210 |
| 5,938,778 A | | 8/1999 | John, Jr. et al. | |
| 5,943,498 A | * | 8/1999 | Yano et al. | 395/704 |
| 5,944,841 A | * | 8/1999 | Christie | 714/38 |
| 5,950,012 A | | 9/1999 | Shiell et al. | 395/712 |
| 5,953,538 A | | 9/1999 | Duncan et al. | 395/842 |
| 5,956,477 A | | 9/1999 | Ranson et al. | 395/183.06 |
| 5,978,874 A | | 11/1999 | Singhal et al. | 710/107 |
| 5,978,902 A | | 11/1999 | Mann | 712/227 |
| 5,983,017 A | | 11/1999 | Kemp et al. | 395/704 |
| 5,983,366 A | * | 11/1999 | King | 714/38 |
| 5,983,379 A | | 11/1999 | Warren | 714/727 |
| 5,996,092 A | * | 11/1999 | Augsburg et al. | 714/38 |
| 5,999,112 A | | 12/1999 | Omori | |
| 6,094,729 A | * | 7/2000 | Mann | 714/25 |
| 6,108,761 A | | 8/2000 | Johnson et al. | |
| 6,145,099 A | * | 11/2000 | Shindou | 714/37 |
| 6,145,123 A | * | 11/2000 | Torrey et al. | 717/4 |
| 6,148,381 A | * | 11/2000 | Jotwani | 711/158 |
| 6,154,857 A | * | 11/2000 | Mann | 714/30 |
| 6,167,499 A | | 12/2000 | Letham | |
| 6,185,732 B1 | * | 2/2001 | Mann et al. | 714/4 |
| 6,243,836 B1 | * | 6/2001 | Whalen | 714/45 |
| 6,269,454 B1 | * | 7/2001 | Mann et al. | 714/25 |
| 6,282,701 B1 | * | 8/2001 | Wygoday et al. | 717/4 |
| 6,314,530 B1 | * | 11/2001 | Mann | 714/38 |
| 6,345,295 B1 | | 2/2002 | Beardsley et al. | |
| 6,370,660 B1 | * | 4/2002 | Mann | 714/38 |

FOREIGN PATENT DOCUMENTS

| | | |
|---|---|---|
| JP | 10106269 A | 4/1998 |
| JP | 10124484 A | 5/1998 |
| JP | 10177520 A | 6/1998 |
| WO | WO98/13759 | 4/1998 |

* cited by examiner

Address Offset = Absolute Address − Previous Address

Offset Address
Formats

CIRCUIT FOR STORING TRACE INFORMATION

BACKGROUND OF THE INVENTION

1. Field of the Invention

The invention relates generally to performing trace on a system-on-chip (SOC), and more specifically, to storing trace information.

2. Related Art

System-on-chip devices (SOCs) are well-known. These devices generally include a processor, one or more modules, bus interfaces, memory devices, and one or more system busses for communicating information. Because multiple modules and their communications occur internally to the chip, access to this information is generally difficult when problems occur in software or hardware. Thus, debugging on these systems is not straightforward. As a result of development of these SOCs, specialized debugging systems have been developed to monitor performance and trace information on the chip. Such systems typically include dedicated hardware or software such as a debug tool and debug software which accesses a processor through serial communications.

However, debugging an SOC generally involves intrusively monitoring one or more processor registers or memory locations. Accesses to memory locations are sometimes destructive, and a data access to a location being read from a debugging tool may impede processor performance. Similarly, accesses are generally performed over a system bus to the processor, memory, or other module, and may reduce available bandwidth over the system bus for performing general operations. Some debugging systems do not perform at the same clock speed as that of the processor, and it may be necessary to slow the performance of the processor to enable use of debugging features such as obtaining trace information. By slowing or pausing the processor, some types of errors may not be reproduced, and thus cannot be detected or corrected. Further, accurate information may not be available altogether due to a high speed of the processor; information may be skewed or missing.

Some systems include one or more dedicated functional units within the SOC that are dedicated to debugging the processor, sometimes referred to as a debug unit or module. However, these units affect the operation of the processor when obtaining information such as trace information. These devices typically function at a lower speed than the processor, and thus affect processor operations when they access processor data. The debug system relies upon running debug code on the target processor itself, and this code is usually built into the debugee. Thus, the presence of the debug code is intrusive in terms of memory layout, and instruction stream disruption.

Other debugging systems referred to as in-circuit emulators (ICEs) match on-chip hardware and are connected to it. Thus, on-chip connections are mapped onto the emulator and are accessible on the emulator. However, emulators are prohibitively expensive for some applications, and do not successfully match all on-chip speeds or communications. Thus, emulator systems are inadequate. Further, these systems generally transfer information over the system bus, and therefore necessarily impact processor performance.

Another technique for troubleshooting includes using a Logic State Analyzer (LSA) which is a device connected to pins of the integrated circuit that monitors the state of all off-chip communications. LSA devices are generally expensive devices, and do not allow access to pin information inside the chip. In sum, there are many systems which are inadequate for monitoring the internal states of a processor and for providing features such as real-time state and real-time trace in a non-intrusive manner.

SUMMARY OF THE INVENTION

These and other drawbacks of conventional debug systems are overcome by providing a non-intrusive trace system which receives trace information from one or more processors or other devices. The trace system may include a first-in, first-out (FIFO) buffer which stores trace information. In one embodiment, the FIFO buffer is memory-mapped and is capable of being accessed by other systems without affecting processor performance. In one aspect of the invention, the trace system includes a trace buffer which receives information at an internal clock speed of the processor.

Non-intrusive methods are provided that specify what to do with trace information directly and do not interfere with processor operation. Specifically, the trace system includes devices which operate separately from the processor, operate at internal clock speeds of the processor, or operate in modes wherein the loss of trace information does not affect processor operation. Further, the trace information collected includes all of the information needed to perform trace operations; the processor does not need to be interrupted to obtain additional information, such as by a software program running on a debug tool. According to one aspect of the invention, the trace system is implemented in hardware associated with the processor, the hardware not requiring software intervention. In one embodiment, the trace information includes both address information and message information. In another aspect, the trace information includes timing information. In one aspect, the trace system may be used as a rate converter for converting a transmission rate of messages transmitted to a memory system on-chip or an external system.

In another aspect, the trace information may be compressed by the trace system. By compressing information, trace information is preserved for transmission over lower-bandwidth links and maximizes on-chip trace storage. For example, trace information may be compressed by compressing timestamp and address information. Further, trace information may be compressed by omitting duplicate types of information, such as one trace packet of a particular operation type. Also, information may be filtered by predefining criteria upon which trace information is generated. By filtering information and eliminating duplicate information on-chip, bandwidth requirements of links to external systems and on-chip storage requirements are reduced. A trace message may be compressed by replacing an absolute value of a data field in the message with a relative value. Periodic reference messages including absolute values of compressed information may be provided to provide a reference for the relative value.

These and other advantages are provided by an integrated circuit comprising at least one processor; a debug module operatively connected to the processor, the debug module including a FIFO buffer wherein the debug module is configurable by a user to store trace information produced by the processor in one of the following modes: a mode wherein the FIFO buffer is configured as a circular buffer; a mode wherein the debug module stops storing trace information when the FIFO buffer is full; and a mode wherein the debug module discards additional trace information when the FIFO buffer is full.

In one aspect, the debug module provides an indication to the processor that the FIFO is approaching a full level. The debug module may, for example, provide the indication within a finite number of storage locations from the full level of the FIFO. In one aspect, in the mode wherein the debug module stops storing trace information when the FIFO buffer is full, the integrated circuit generates an interrupt to disable storing of trace information or the generation of trace information. The integrated circuit may also execute handler code that accepts the interrupt and disables the storing of trace information or the creation of trace information, or empties the FIFO such that additional trace information can be stored. Alternatively, a software system may be provided that allows a user to manually inspect contents of the FIFO. In one aspect, the trace information includes address and message information.

In one aspect, the trace information is stored on byte-based boundaries. In one aspect, the trace information stored in the FIFO includes variable length messages. The trace information may also include a plurality of state information bits representing triggered conditions of the processor.

In one embodiment, storage locations of the FIFO are memory-mapped storage registers.

In one aspect of the invention, the FIFO receives trace information from a capture buffer operatively coupled to the processor. In one embodiment, the capture buffer is operatively coupled to the processor and other trace-generating devices by a bus separate from the system bus.

In one aspect, the debug module provides a control signal to the processor to stall execution of new instructions. In one aspect, the debug module provides the control signal to stall the processor in response to the capture buffer reaching a level of storage within a finite number of storage locations from the full level of the capture buffer. In one aspect, the debug module provides the control signal to stall the processor in response to the FIFO reaching a level of storage within a finite number of storage locations from the full level of the FIFO. In one aspect, the finite number of storage locations is greater than or equal to a number of trace messages that are capable of being produced by the stalled processor.

According to another aspect of the invention, an integrated circuit is provided comprising at least one processor; a debug module operatively connected to the processor, the debug module including a FIFO buffer wherein the debug module is configurable by a user to store trace information produced by the processor, and wherein the FIFO includes a plurality of memory-mapped registers configured to hold the trace information.

In one aspect, the FIFO operates in a mode wherein trace information is discarded when the FIFO buffer is full. In one aspect, the debug module provides an indication to the processor that the FIFO is approaching a full level. The debug module may also provide the indication within a finite number of storage locations from the full level of the FIFO.

In one aspect, the memory-mapped registers are read by a read circuit independent from the processor. According to another embodiment, the integrated circuit further comprising a system bus and wherein trace information is transmitted over a communication link separate from the system bus.

In one aspect, the trace information comprises at least one of program counter information; process identification information; address information; information stored in memory; and information related to a system bus transaction.

In one aspect, the trace information is stored in a RAM-based storage unit.

In one aspect, the trace information is stored in both RAM-based FIFO and the FIFO buffer.

According to another aspect of the invention, an integrated circuit chip is provided comprising at least one processor; a debug module operatively connected to the processor, the debug module including a first-in first out (FIFO) buffer wherein the debug module is to configurable by a user to store trace information produced by the processor; and an interface for transmitting trace information off-chip, wherein the trace information is stored in compressed format and transmitted off-chip. In one embodiment, the trace information is selectively transmitted to at least one of a memory circuit associated with the processor; and a link coupled to a debug system external to the debug module. In one aspect of the invention, the trace information includes an indication that one or more trace packets were lost. In another embodiment, the trace information includes an indication that the processor was stalled while generating the trace information.

In one aspect, the integrated circuit includes circuitry that compressed the trace information by representing at least one of an operand address, program counter, bus analyzer and instruction addresses as a signed address offset relative to the at least one address; and representing timing information by a time difference. In one embodiment, address offsets are determined by subtracting a previously sent address from a new address.

In one aspect of the invention, a method is provided for compressing trace information of a computer system, the method comprising steps of representing at least one of an operand address, program counter, bus analyzer and instruction addresses as a signed address offset relative to the at least one address; and representing timing information by a time difference. In one embodiment, the trace information is generated by at least one processor and the method further comprises a step of sending a reference message including at least one of timing information representing a time state of a processor process; a program counter of the processor; and an address of a device of a system bus. In another aspect of the invention, a decompression method is provided which recovers absolute information from the time difference and/or relative address information and information received in previous trace messages.

In one aspect, absolute or relative encoding of at least one of address information and timing information generating header information for the trace information, the header including: type of trace message source of the trace message wherein the information of the source of the message may include at least one of an indication of a source module which generated the message an indication of a channel of the source module that generated the message. In one embodiment, the header includes an indication of whether the address information is absolute address information or relative address. In one embodiment, the relative address is a signed offset address. In one aspect, the timing difference information represents a number of timer increments since a last reference trace message was generated. In one aspect, the trace information includes data written to memory of the computer system.

Further features and advantages of the present invention as well as the structure and operation of various embodiments of the present invention are described in detail below with reference to the accompanying drawings. In the drawings, like reference numerals indicate like or functionally similar elements. Additionally, the left-most one or two digits of a reference numeral identifies the drawing in which the reference numeral first appears.

BRIEF DESCRIPTION OF THE DRAWINGS

This invention is pointed out with particularity in the appended claims. The above and further advantages of this invention may be better understood by referring to the following description when taken in conjunction with the accompanying drawings in which similar reference numbers indicate the same or similar elements.

In the drawings.

DETAILED DESCRIPTION

Figure 1:
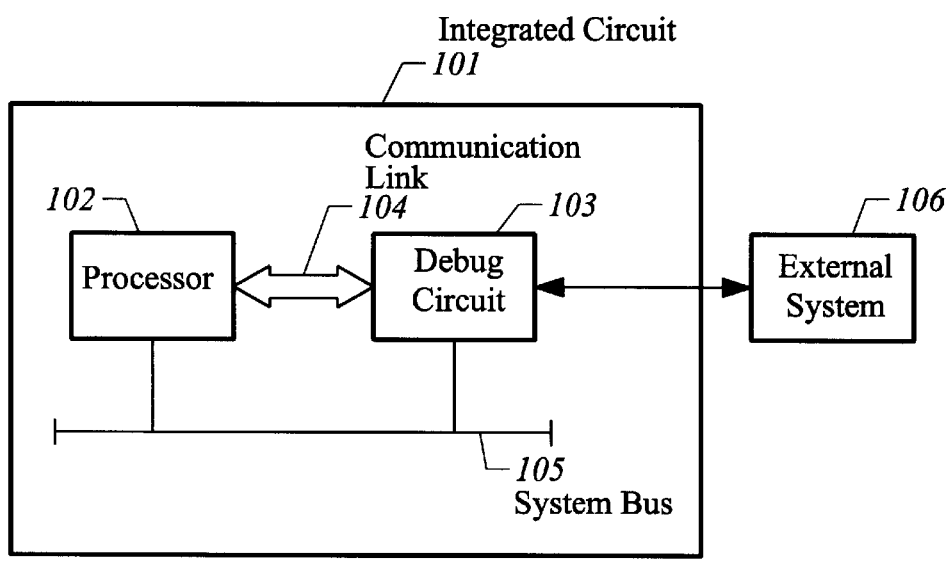
FIG. 1 is a block diagram of an integrated circuit in accordance with one embodiment of the invention.

One embodiment of the invention is described with particularity with respect to FIG. 1. FIG. 1 shows a block diagram of an integrated circuit device 101, or system-on-chip (SOC) mentioned above. This circuit may include a processor 102 and debug circuit 103 interconnected by a system bus 105. System bus may be a conventional bus, packet switch, or other communication medium used to communicate operating information between modules of device 101. Operations such as reads, writes, swaps, and the like are typical operations that are performed between modules.

Processor 102 is a device which is adapted to read and execute program code in a one or more processor instructions, and to perform operations on data. Processor 102 may read data from a number of data sources, and write data to one or more data stores (not shown). These data stores may include Random Access Memory (RAM), a computer hard disc accessible through a hard disc controller, storage accessible over one or more communication links, or any entity configured to store data. These storage entities may be accessible directly on system bus 105 or may be accessible through an external communication link.

Communication link 104 couples processor 102 to debug circuit 103, and, according to various embodiments of the invention, is separate from system bus 105. Link 104 is configured to transfer debug information from processor 102 to debug circuit 103, and to transfer state and processor control information from the debug circuit 103 to processor 102. It should be understood that debug circuit 103 could be coupled to one or more processors 102, or other devices. Debug circuit 103 may be, for example, coupled to one or more processors through a multiplexer device which multiplexes state and control information to and from the processors.

In one aspect of the invention, processor 102 provides trace information to debug circuit 103 over link 104, and provides this information in a manner which does not affect processor 102 performance or system bus 105 performance. Alternatively, trace information is generated by one or more modules attached to system bus 105, the modules including processors, interface modules, bus controllers, bus analyzers, or any module capable of generating trace information. Trace information is received by debug circuit 103, where it is processed and stored or transmitted to an external system 106.

In general, only a finite amount of trace information can be gathered non-intrusively, that is without perturbing the processor with exceptions or interrupts. According to various embodiments, debug circuits attempt to maximize the amount of trace information that can be collected.

Some techniques may be used to maximize the amount of trace data gathered non-intrusively:

Compress information prior to storing the trace information on-chip or sending the trace information off-chip. For example, instruction address, operand addresses, and timestamp information may be compressed to save storage space, and to reduce an amount of bandwidth needed to transfer the trace information to an external system 106.

Tracing without stalling the processor.

Some tracing information may be lost which is acceptable, provided it is possible to determine at which point trace data was lost. A debug system may provide indications of lost messages to an external system 106 (i.e., a debug tool), such as in trace messages themselves, or through signaling. By including information in trace messages, the point at which trace information is lost may be determined.

Tracing with processor stalling. This type of tracing involves stalling the processor when a trace system cannot accept additional trace information, such as when a trace buffer becomes full or other resource is not available. This tracing scheme allows accurate trace data to be gathered up to a pre-determined point. This type of tracing is beneficial when saving of all trace information during a finite period of time is critical. In addition, if resources in the debug circuit are not available, the debug circuit may provide control signals to stall the processor such that trace information is preserved.

The debug circuit may then generate a debug interrupt, and execute handler code to disable a collection of trace information to allow the processor to proceed unaffected. Alternatively, circuitry that generates trace information may be disabled. The debug circuit can extract the data and begin collecting trace information. In another embodiment, the debug circuit can extract the trace data from the trace buffer while the processor is suspended, and the processor may be re-started. Also, a trigger signal may be provided from the debug circuit to an external system that indicates trace-related states, such as a trace buffer or FIFO becoming full or near-full, or that the processor is stalled due to a trace buffer or FIFO being or becoming full. External triggers may indicate that the external system should empty the trace buffer or FIFO, or take other corrective actions.

Further, trace information may be gathered intelligently such that the amount of trace generated is reduced. When trace is being extracted, there are usually specific items of interest. For example:

When performing branch tracing for call graph profiling, only subroutine branches and return from subroutine branches are of interest.

When tracing code or data flows in an application, the code or data flows are usually considered for a single processor process at one time.

Branch trace, or data trace analysis, can sometimes be considered in a single code range or function at one time.

Conventional external systems 106 such as logic analyzers and external trace buffer systems typically need to extract all of the trace information externally, and then filter the trace information within the external system 106 itself. Thus, conventional trace solutions systems do not make good use of off-chip communication bandwidth. According to various embodiments of the invention, trace may be filtered, generated selectively, and compressed to reduce the amount of space required to store trace data on-chip as well as reduce the amount of off-chip data transfer.

Figure 2:
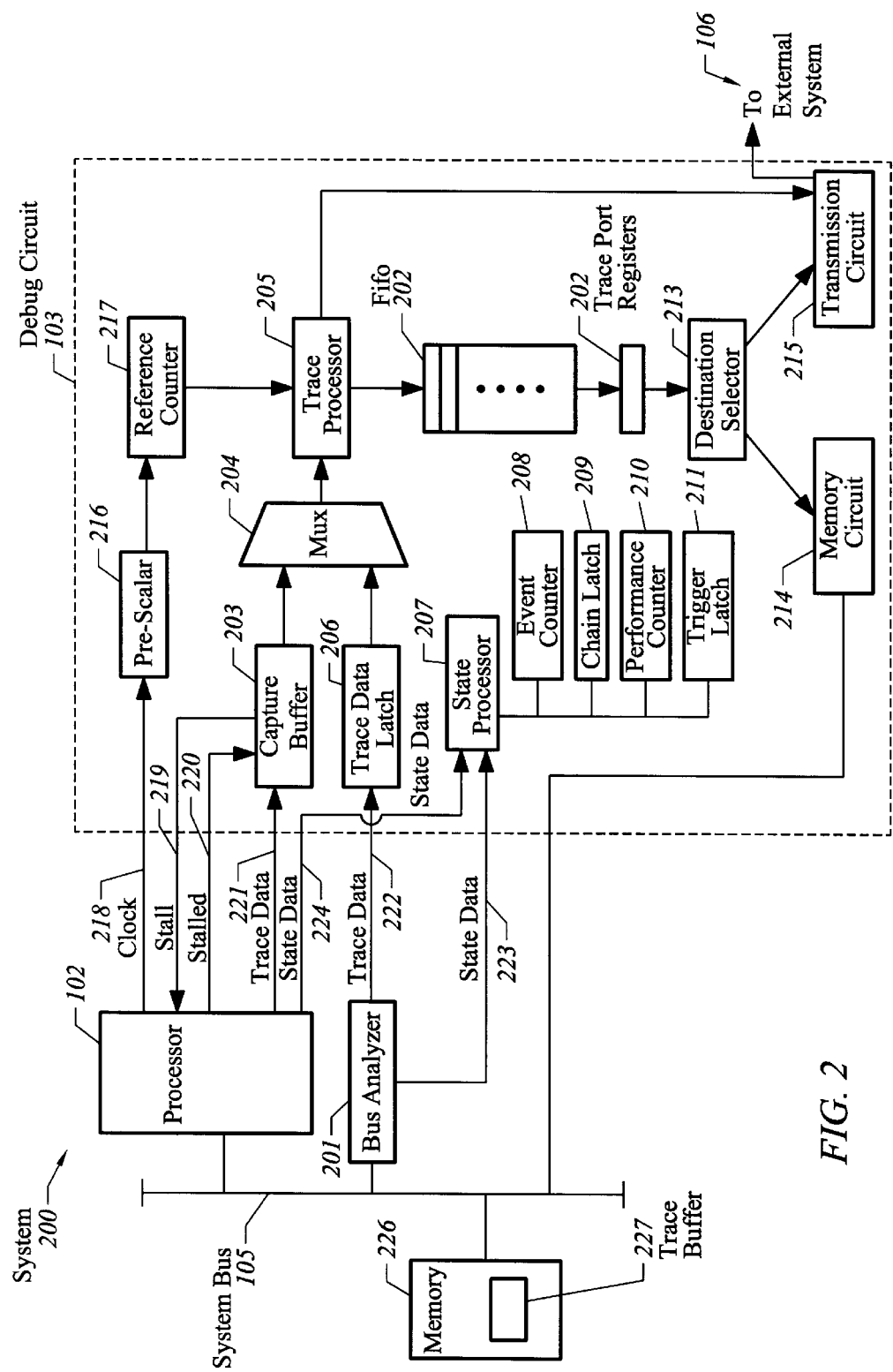
FIG. 2 is a detailed block diagram of an integrated circuit in accordance with one embodiment of the invention.

FIG. 2 shows a more detailed diagram of a system according to one embodiment of the present invention. System 200 includes a processor 102, and a debug circuit 103 connected by a system bus 105 and by a communication link including a clock signal 218, a stall signal 219, stalled signal 220, trace data 221, trace data 222, and state data 223.

Debug circuit 103 includes a trace processor 205 which receives information from capture buffer 203 or trace data latch 206 and time stamped information received from reference counter 217 and formats the received data into trace data which are stored in FIFO 202. According to one embodiment, FIFO 202 is used as a temporary area for storing trace messages. FIFO 202 holds trace messages awaiting to be sent to an external system 106, or which are waiting to be written into a trace buffer configured in system memory. Destination selector 213 may be programmable to send information to an external system via transmission circuit 215, or save memory in trace buffer (not shown) through memory circuit 214. Memory circuit 214 may be configured as a circular trace buffer wherein trace messages are overwritten in a circular fashion when the trace buffer fills, or in a trace buffer hold mode wherein trace information is discarded when the trace buffer fills. In trace hold mode, contents of the FIFO are not automatically output to an external system 106 or placed in a trace buffer, but are held in the FIFO. An external system 106 such as a debug tool may be configured to extract trace messages from the FIFO.

In one embodiment, the capture buffer 203 of the debug circuit 103 includes a buffer control circuit 1001 to and a buffer 1002 to communicate with the processor 102.

Similarly, FIFO 202 may be configured to discard new trace messages until the trace information is read by the processor or by an external system 106, hereinafter referred to as a FIFO trace hold mode. FIFO 202 may also be configured such that when FIFO 202 reaches a "high water mark," or predetermined number of locations in the FIFO 202 below a full-level of the FIFO 202, new trace messages are discarded. Also, the FIFO can be configured as a circular FIFO mode wherein old messages in the FIFO are overwritten by new ones such that the FIFO contains the most recent trace messages generated. When in FIFO trace hold mode or trace buffer hold mode, the debug circuit can be programmed to either stall the processor 102 or discard trace messages. In FIFO trace hold mode, for example, a trigger signal to is external device 106 may be provided to indicate that the external system should empty the FIFO or take other corrective actions. It should be understood that any type of storage device may be used to implement the various modes described above.

A trace data bus 221 connects the processor 102 to debug circuit 103 may be capable of transferring information about processor states every processor clock cycle. Also, trace data bus 221 can contain individual bits for each processor state monitored such that multiple states may be monitored within the same clock cycle. State data 224 is loaded into capture buffer 203 along with the current value of the program counter. Trace message generation logic in trace processor 205 extracts state information details from capture buffer 203 and loads corresponding trace messages into FIFO 202.

Circuit 103 also includes a state processor 207, one or more event counters 208, one or more chain latches 209, performance counter 210, and trigger latch 211. When a particular state occurs in processor 102 or bus analyzer 201, state data 223, 224 indicates that a particular state has occurred, and state processor 207 may perform one or more actions within the debug circuit 103, such as incrementing an event counter 208, setting or clearing a value stored in a chain latch 209, incrementing a performance counter 210, controlling a trigger-out signal stored in a trigger latch 211 or other action within debug circuit 103. State processor 207 and trace processor 205 may be combined as the same processor or operate as separate entities.

Trace data stored in capture buffer 203 and trace data latch 206 may be processed through a multiplexer 204 and fed to trace processor 205, such that both trace information from processor 102 and bus analyzer 201 may be stored within the same FIFO 202. It should be understood, however, that separate FIFO's may be used.

Clock signal 218 may be the clock signal of processor 102 running at processor clock frequency. Signal 218 may be fed to a pre-scaler 216 circuit which determines time increments for a timestamp counter. For example, the pre-scaler may divide the processor clock frequency by an integer value, or may use the processor clock frequency value directly. Pre-scaler 216 provides an increment signal to a reference counter 217 which generates a reference count from a predetermined time. Reference counter 217 may provide an absolute count of time to trace processor 205 for preparing timestamp information. In one embodiment, reference counter 217 provides a 40-bit time value to trace processor 205. Trace processor 205 may in turn determine a time difference from the last trace message generated, and compress timestamp information by encoding the time difference as timestamp information in a trace message.

Figure 3:
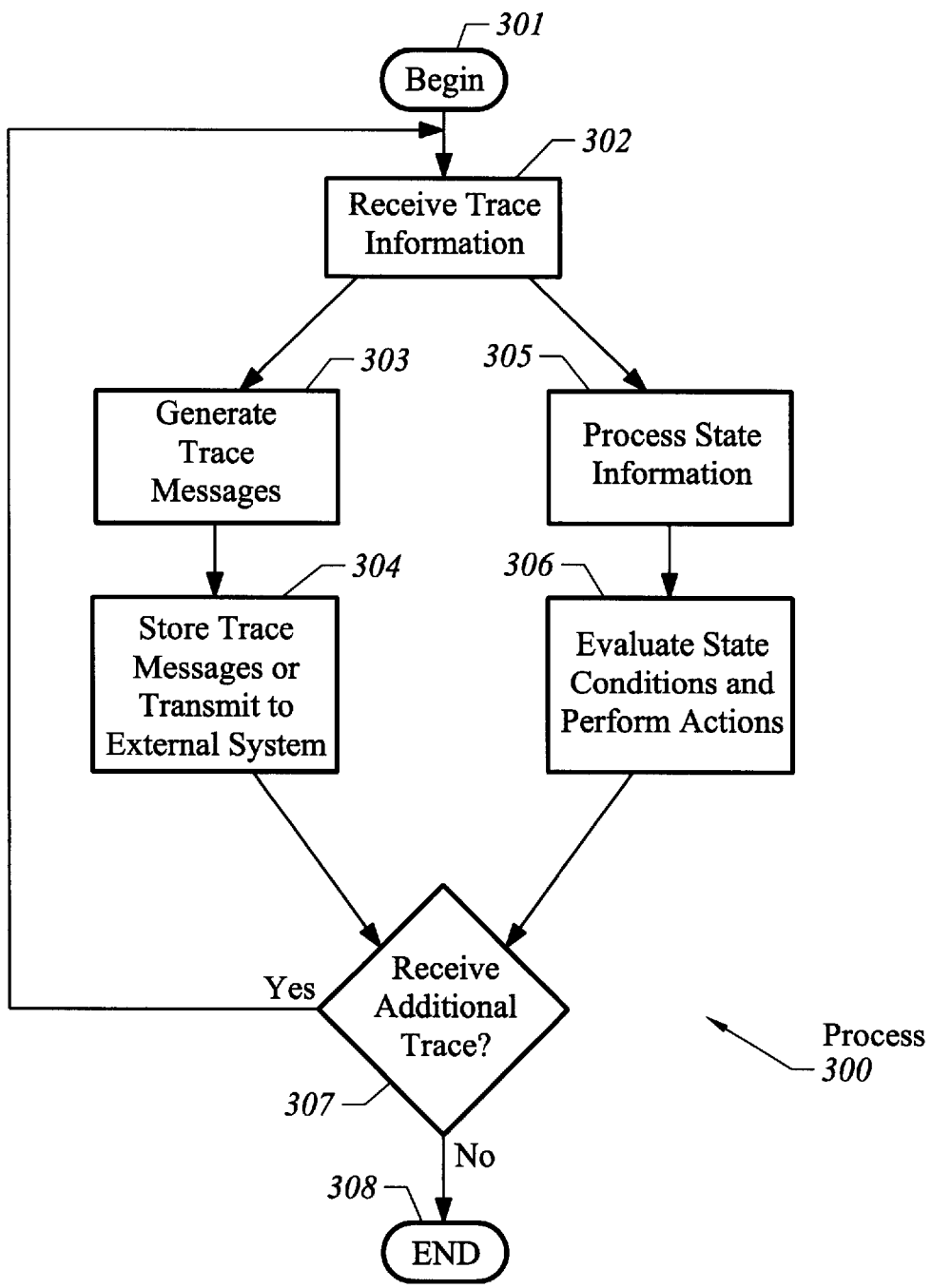
FIG. 3 is a flowchart of a process for processing trace information.

FIG. 3 shows a process for processing trace information. At step 301, process 300 begins. At step 302, circuit 103 receives trace information from processor 102. At step 303, circuit 103 may generate trace messages, and store them or transmit them to an external system at step 304. Further, circuit 103 may process state information received from processor 102 at step 305, and evaluate state conditions and perform actions at step 306. As discussed above, actions may include setting registers in debug circuit 103, generating trace messages, raising exceptions, or performing actions on the processor, such as loading and executing debug software. At step 307 debug circuit 103 determines whether to receive additional trace information. If so, debug circuit may receive additional trace packets within capture buffer 203 or trace data latch 206. If not, circuit 103 may discard additional trace data, or stall processor 102 until additional trace information can be processed. At step 308, process 300 ends.

Figure 4:
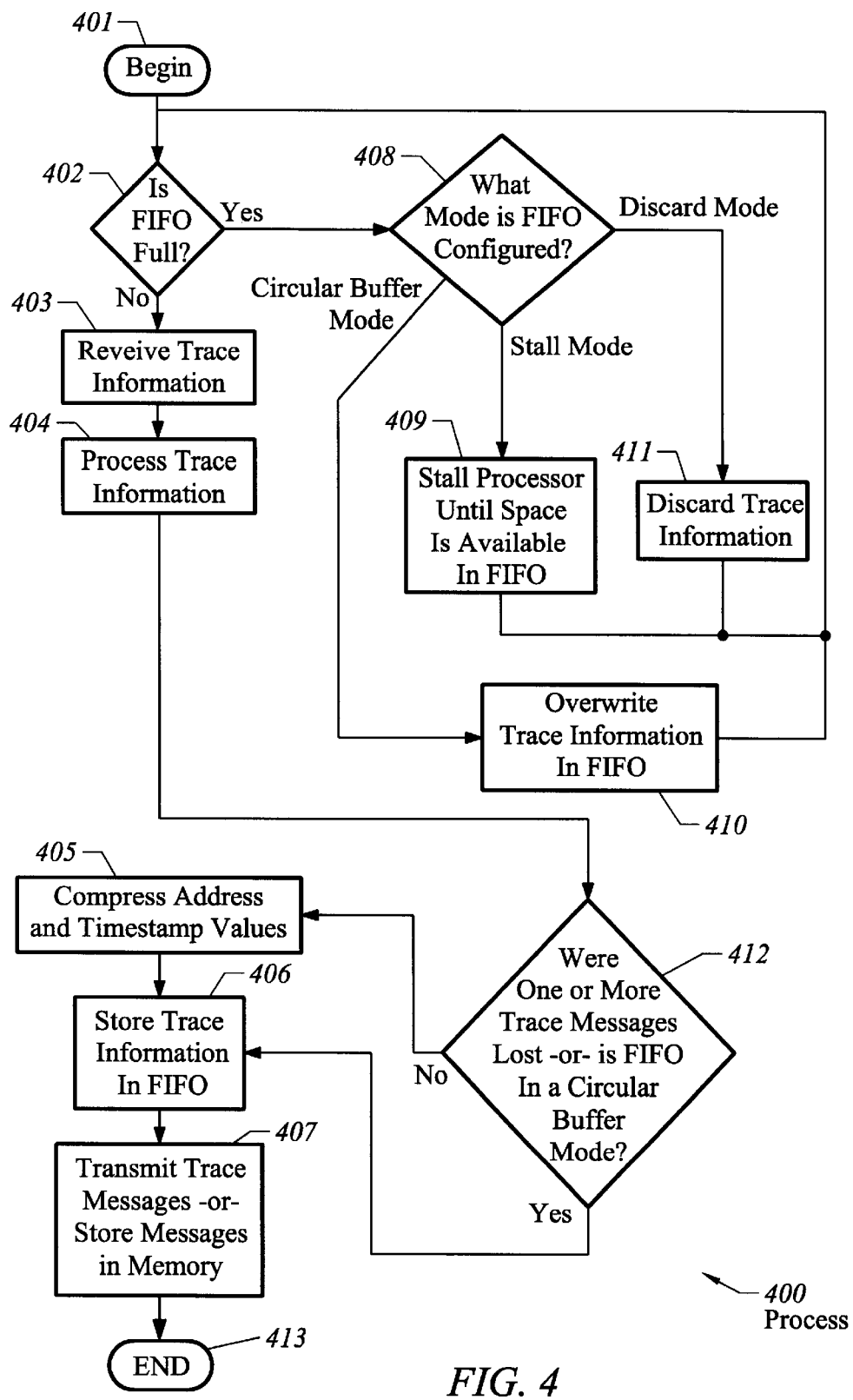
FIG. 4 is a flowchart of a process for receiving trace information.

FIG. 4 shows a process 400 for receiving trace information. At step 401, process 400 begins. At step 402, circuit 103 determines if the FIFO 202 is full, or has reached a high water mark as discussed above with reference to FIG. 2. If so, circuit 103 determines what mode the FIFO 202 is configured at step 408. Also, circuit 103 may provide an indication to external system 106 that FIFO 202 is full. In one embodiment, the signal may be encoded in a trace message transmitted to external system 106. Alternatively, circuit 103 may determine that the FIFO is approaching a full level at step 402. Circuit 402 may determine that FIFO has reached a level of storage within a finite number of storage locations from a full level of the FIFO. The number of storage locations in the FIFO may be fixed, or programmable by a user through software, and the number of storage locations used may be stored in a register that tracks the number of entries in the FIFO buffer when the level of the FIFO 202 exceeds a certain level whose value may be fixed or programmable, the processor may be stalled. The finite number of storage locations may be greater than or equal to a number of trace messages that are capable of being produced by the processor, in a time period such as after a processor stall. Thus, because the processor can be stalled before FIFO is full, trace messages can be preserved. It should be understood that other methods of detecting the fullness of FIFO 202 may be used.

FIFO 202 may be configured in a circular buffer mode wherein old trace messages in FIFO 202 are overwritten by new ones such that FIFO 202 contains the most recent trace messages generated. Trace messages generated in circular buffer mode may include absolute values of address and timing information which is not compressed, such that overwriting of reference information (discussed below with respect to FIGS. 11A and 11B and Table 7) does not affect reconstruction of compressed information. In circular buffer mode, memory-mapped registers may allow the FIFO 202 contents to be read. At step 410, circuit 103 overwrites the trace information in the FIFO 202.

At step 411, if the FIFO is configured in discard mode, trace messages are accumulated in the FIFO 102 until it fills. When the FIFO 202 fills, new trace messages are discarded. In this mode, memory-mapped registers may allow FIFO 202 contents to be read.

At step 409, if the FIFO is configured in stall mode, the capture buffer will stall processor 102 until space is available in the FIFO. Stall mode may be used such that trace messages are not discarded.

If the FIFO is not full, trace processor 205 receives additional trace information from the capture buffer 203 or trace data latch 206 and processes trace information at step 404. If, at step 412, one or more trace messages were lost or the FIFO is in circular buffer mode as discussed above, and compressed information is not preferred, trace information could be stored in FIFO 202 in uncompressed format at step 406. For example, compressed trace information which includes information relative to information in a previous lost trace message cannot be constructed, thus absolute information is used in encoding a new trace message. Alternatively, at step 405, the trace processor may compress trace information before storing the information in FIFO 202. For example, trace processor 205 may compress address and timestamp values in accordance with a compression protocol, such as the one described below with reference to FIGS. 11A and 11B. At step 406, trace processor 205 stores trace information in FIFO 202, wherein the most recent trace messages are at the head of the FIFO, and the oldest trace messages are read out through trace port registers 212.

At step 407, debug circuit 103 may transmit trace messages to an external system, such as through transmission circuit 215 or may store trace messages through a memory circuit 214. In one embodiment, memory circuit 214 is operatively coupled to system bus 105, and may perform right functions to system memory associated with integrated circuit 101. As discussed above, debug circuit 103 includes a destination selector 213 which allows a user to select the destination of trace messages. The destination may be configurable through a programmable register located in debug circuit 103. At step 413, process 400 ends.

Figure 5:
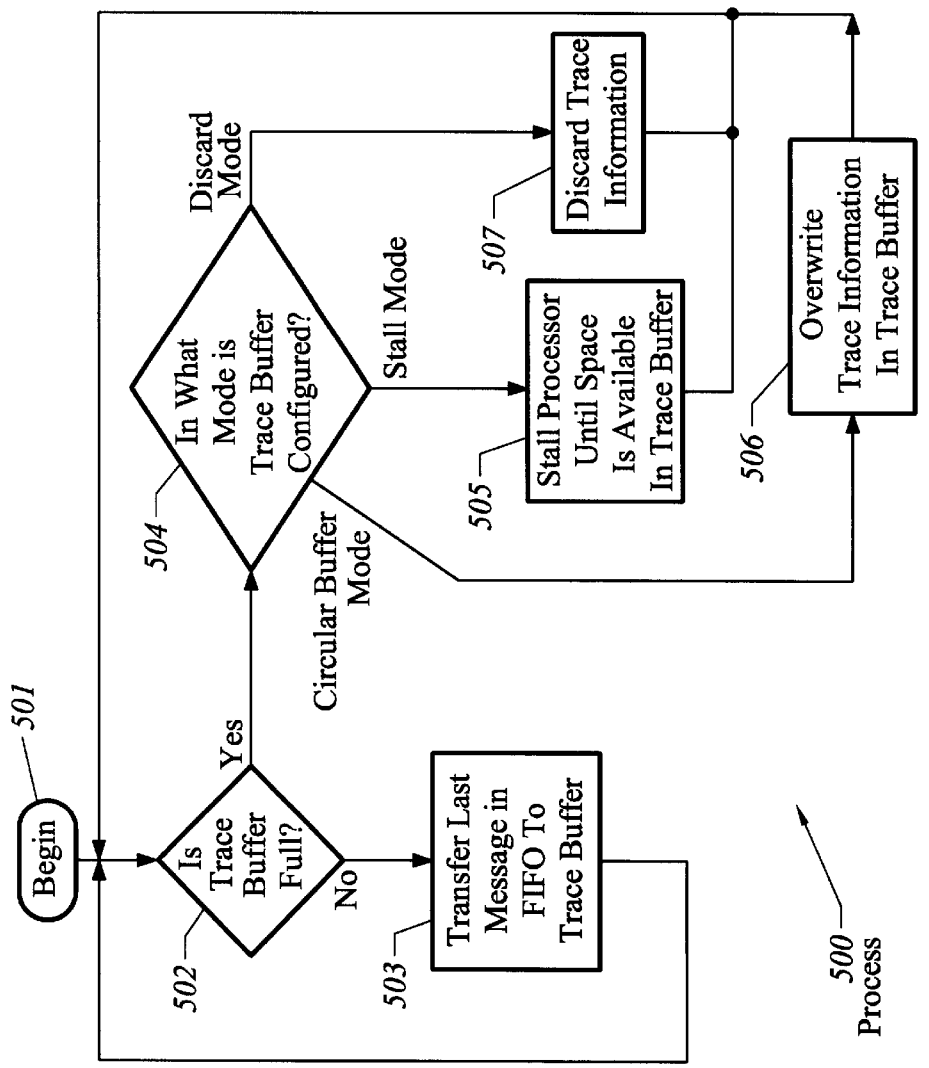
FIG. 5 is a flowchart of a process for receiving trace information based on a trace buffer mode.

FIG. 5 shows a flowchart of a process for receiving trace information based on the trace buffer mode. At step 501, process 500 begins. At step 502, debug circuit 103 determines whether the trace buffer is full. Information regarding the trace buffer may be stored in debug circuit 103, including information regarding the number of entries and the maximum size of the trace buffer. In one embodiment, the size of the trace buffer is programmable through registers located in debug circuit 103. If the trace buffer is fill, debug circuit 103 determines what mode the trace buffer is configured at step 504. If the trace buffer is operating in circular buffer mode, all entries will be overwritten by new entries once the buffer fills, such that the buffer contains the most recent trace message. At step 506, circuit 103 overwrites the trace information in the trace buffer.

If a trace buffer is configured in stall mode, circuit 103 will stall processor 102 until space is available in the trace buffer at step 505. If the trace buffer is not full, circuit 103 transfers the last message in the FIFO to the trace buffer at step 503. As discussed, memory circuit 214 may access system bus 105 to write the trace information into location and system memory.

As discussed above, state values may be transferred to debug circuit 103, the state values being represented by one or more signals that indicate one or more states of processor 102. For example, a watchpoint channel may be defined in processor 102 which compares a register with a particular data value such as a data address accessed in memory of a computer, the address of a module located on the system bus 105, an address of an operand executed by the processor, or any other condition in the processor that can be matched by one or more predetermined values. Watchpoint channels include a matching mechanism whereby data values written to registers in processor 102 are compared with data values in processor 102 including instruction addresses, instruction values, operand addresses, performance counters, event counters, and the like.

When matched, a controller associated with the watchpoint channel may provide a signal to debug circuit 103 through communication link 215. This signal may take the form of state bits indicating particular watchpoint channel states within the processor 102 communicated to debug circuit 103. Also, state bit values corresponding to watchpoint channels can be combined together to effect different debugging operations by debug circuit 103, and these state bit values may also be communicated.

In a similar manner, debug circuit 103 may provide a number of signals to the processor for use in debugging operations. In particular, debug circuit 103 may provide a number of bit values which operate as preconditions to triggering particular events in the processor 102. These events may then generate trace information or other state information to be received by debug circuit 103.

Further, watchpoint channels may cause the processor 102 to generate a trace packet and, in some cases, generate an exception. The watchpoint channels themselves may also have preconditions which determine whether or not they will generate state information, match conditions which indicate whether or not a match will occur for a particular watchpoint, and action conditions which will determine if and what type of action occurs based on a watchpoint channel match.

As discussed above, a number of watchpoints may be defined in both the processor 102 and the debug circuit 103. These watchpoints may determine a state value stored in a data latch located in either processor 102 or debug circuit 103. An output of one data latch may serve as input to another latch (they may be "chained" together), or may function as a precondition for a watchpoint channel. These and other features of watchpoints and data latches are described more fully in co-pending U.S. patent application Ser. No. 09/410,607 entitled MICROCOMPUTER DEBUG ARCHITECTURE AND METHOD, by D. Edwards, et al., filed Oct. 1, 1999, incorporated herein by reference in its entirety.

Figure 6:
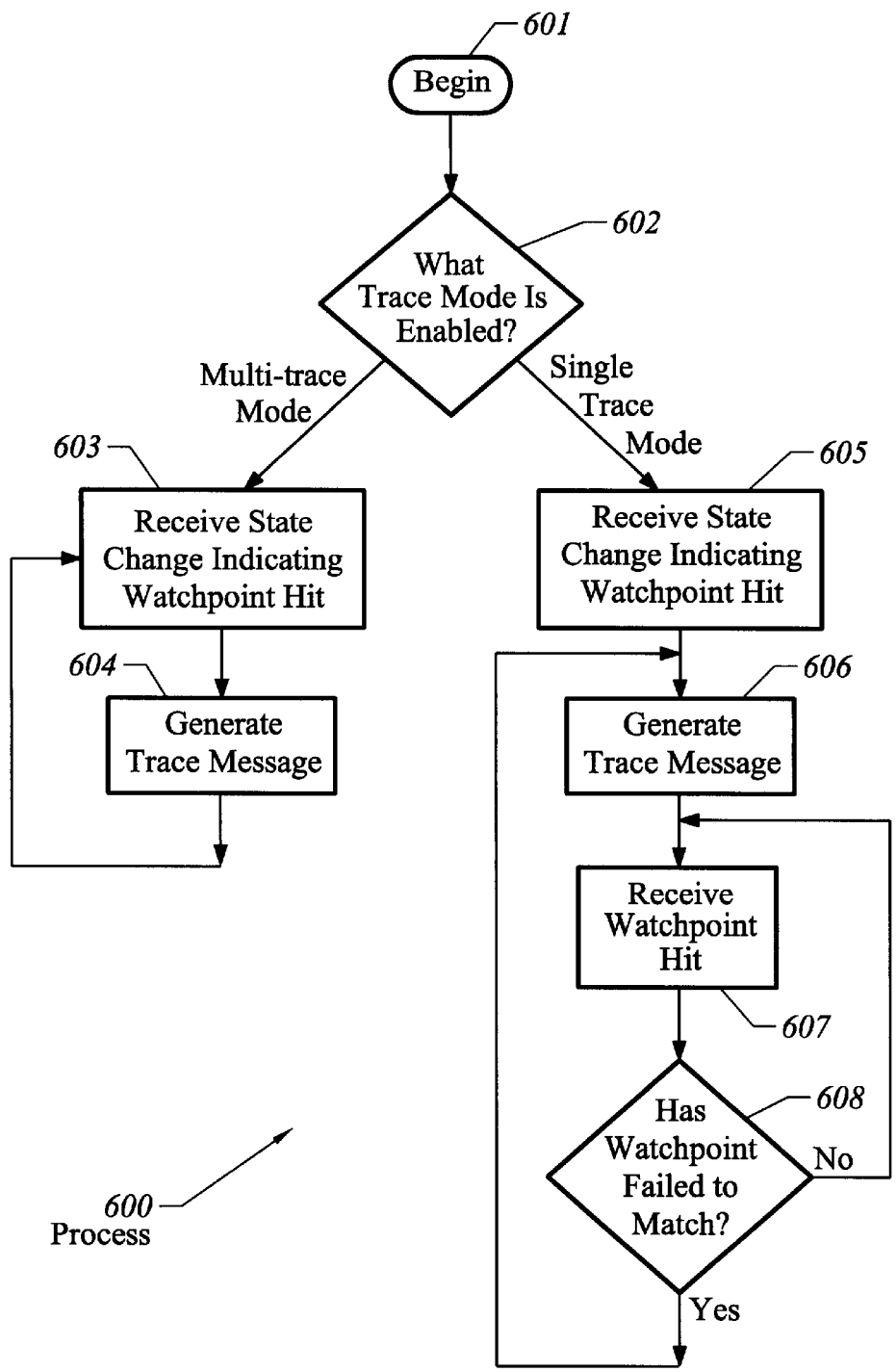
FIG. 6 is a flowchart of a process for generating trace in different trace modes.

FIG. 6 shows a process 600 for generating trace messages based on different trace modes. At step 601, process 600 begins. At step 602, circuit 103 determines what trace mode is enabled. Circuit may be configured in what is referred to as multi-trace mode whereby a trace message is generated for each watchpoint state indication received (steps 603 and 604). Conversely, circuit 103 may be configured in a single trace mode whereby a single trace message will be generated for a series of similar watchpoint states. For example, single trace mode may be used to avoid generating another immediate trace message from being generated. For example, consider an instruction address watchpoint place on an address range A(n) to A(m). The first instruction execution between range A(n) to A(m) generates an instruction address trace message, and all subsequent executions within range A(n) to A(m) will also generate trace messages. In many circumstances, only the first trace message is of interest, and subsequent messages within range A(n) to A(m) are not of interest until the execution has proceeded outside of the range, that is until the watchpoint channel has failed to match. Thus, trace may be collected without the use of exception handlers.

At step 605, circuit 103 receives a state change indicating a watchpoint "hit" or state match. At step 606, trace processor 205 generates a trace message. Circuit 103 then receives another watchpoint hit at step 607. At step 608, circuit 103 determines whether the watchpoint failed to match. If not, circuit 103 may receive additional watchpoint hits without generating additional trace messages. If the watchpoint does fail to match, circuit 103 may generate additional trace messages.

Figure 7:
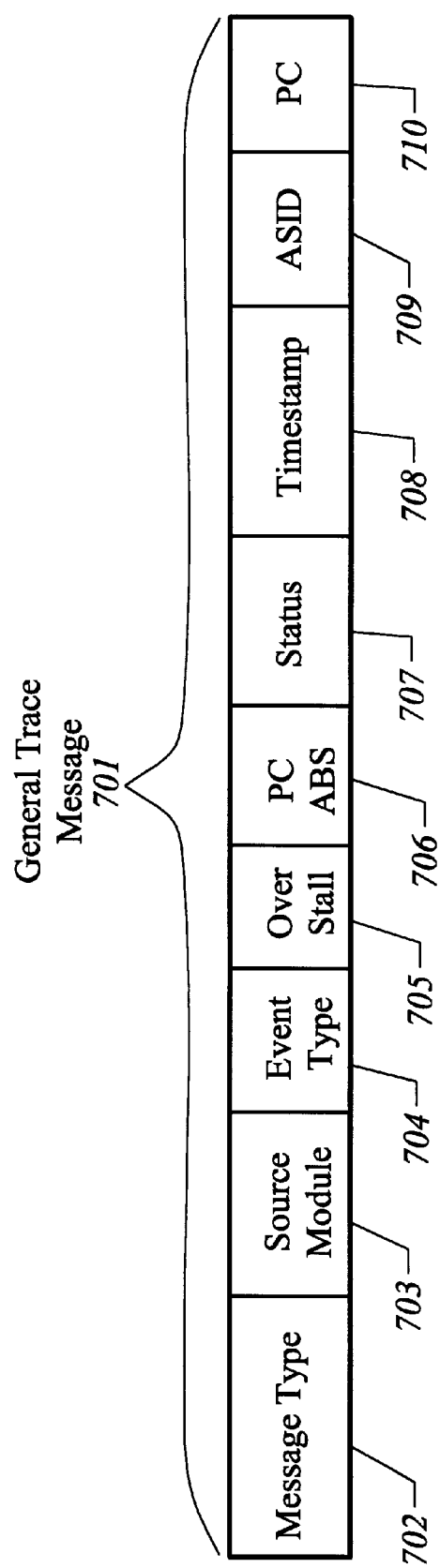
FIG. 7 is a block diagram of a trace message.

FIG. 7 shows the format of a general trace message 701. In one embodiment of the invention, a general trace message format is defined whereby trace message fields are provided for different types of trace messages, and the trace information provided in the message contains all information needed to perform analysis of the trace message. Trace message 701 may include a message type field 702 which indicates the type of trace message, that can be used by a software tool on external system 106 to determine the action required for the trace message. For example, if the message type indicates that it is a background trace message, which is a trace message that does not require immediate action but can be stored within memory of the software tool, the message will be merely stored. Further, a trigger type trace message may indicate to the tool software that immediate action on the trace message is required.

Source module 703 may identify an on-chip source module which provides information in the trace message. For example, source module 703 may identify a watchpoint controller in processor 102, bus analyzer 201, or other devices located through system bus 105. Event type 704 may define the watchpoint channel in the source module which generated the trace message. Overstall 705 may indicate whether, if in stall mode, processor 102 was stalled for some time prior to the current trace message being generated, such as because there was no space available in FIFO 202. In non-stall mode, this bit may be set to indicate that one or more trace messages before the current trace message were discarded, such as because there was no space available in FIFO 202.

PC absolute 706 defines whether the PC field 710 contains an absolute address or a relative address. A relative address may be, for example, a signed offset from the most recent program counter value sent in a previous trace message. Status 707 may be a status which is specific for each watchpoint channel type. Timestamp 708 may be an optional field if circuit 103 is configured to include timestamp information within trace messages. Timestamp 708 may be, for example, a value which specifies a number of timer increments since a last reference trace message was generated (reference trace messages will be described in more detail below). ASID 709 is an optional field which may include process identifier information. ASID field 709 may contain a process identifier, for example, to report, in a trace packet, the process identifier of a software process that generated the trace information. Also, ASID field 709 information may be omitted if the ASID value is inconsequential to the debugging process, or if it is understood that the ASID is a particular value. For example, if a watchpoint channel is set up to match on any particular value of an ASID a trace message produced by that watchpoint channel would not need ASID field 709 because, the mere existence of trace message generated from the watchpoint indicates the value of the ASID. PC 710 may be a variable length field which may contain an absolute value of a program counter of processor 102, or a compressed address, such as a relative address. The relative address may be, for example, a signed offset from the most recent program counter value sent in a previous trace message.

Table 1 below shows an example format of a general trace message.

TABLE 1

Example of General Trace Message Fields
General Trace Message Fields

| Field | Size | Header Bit Positions | Description |
|---|---|---|---|
| Message Type | 3-bits | [0, 2] | Defines contents of the debug message field values of 0b010 (DTRC background trace message) and 0b011 (DTRC trigger trace message) indicate the type of trace message. |

TABLE 1-continued

Example of General Trace Message Fields
General Trace Message Fields

| Field | Size | Header Bit Positions | Description |
|---|---|---|---|
| Source Module | 3-bits | [3, 5] | Defines the on-chip source module which provides the information in the trace message. Value - Description 0 - Processor watchpoint controller 1 - Bus Analyzer 2–7 - Reserved for watchpoint logic in additional processors or other modules. |
| Event Type | 5-bits | [6, 10] | Defines the watchpoint channel in the source module which generated the trace message. Values may identify watchpoint channels in the processor and Bus Analyzer. |
| Over Stall | 1-bit | [11] | This bit may have two meanings depending on whether the stall-mode register identifies stall mode or non-stall mode. In stall mode, this bit is set when processor 102 was stalled for some indeterminate time prior to this trace message being generated because there was no space available in the Debug Module FIFO. In non-stall mode, this bit is set to indicate that one or more trace messages before this one were discarded because there was no space available in the Debug Module FIFO. |
| PC Absolute | 1-bits | [12] | Defines whether the PC field contains a 4-byte absolute address or a 1- or 2-byte relative address. A relative address is the signed offset from the most recent PC value sent in a previous trace message (of any type). Value - Description 0 - Relative address offset 1 - Absolute 4-byte address |
| Other | 4-bits | [13, 15] | Specific for each watchpoint channel type. |
| Timestamp | 1-byte | N/A | This optional field occurs in the trace message when the WP channel's action includes enable_trace_timestamp == 1. This one-byte value specifies a number of timer increments since the last Reference trace message was generated (see Table 7). |
| ASID | 1-byte | N/A | This optional field occurs whenever the watchpoint channel if setup to match any ASID. When a watchpoint channel's pre-condition includes asid_enable == 1, then the ASID field does not appear in the trace messages. |
| PC | 1, 2 or 4 bytes | N/A | If the value of PC Absolute is '0', this field is a 1-byte or 2-byte compressed address as a signed offset from the most recent PC value sent in a previous trace message (of any type). If the value of PC Absolute is '1', this field consists of the 4-byte absolute value of the shadow PC. |

Trace messages specific to a type of trace message may be generated. For example, specific trace messages may be generated indicating a particular occurrence in processor 102, such as states triggering watchpoint channels. Tables 2–7 below show embodiments of trace message types for various watchpoint types:

TABLE 2

Instruction Address Watchpoint Trace Message
Instruction Address Watchpoint Trace Message
(3-bytes minimum, 8-bytes maximum)

| Field | Size | Header Bit Positions | Description |
|---|---|---|---|
| Message Type | 3-bits | [0, 2] | 0b010 or 0b011 |
| Source Module | 3-bits | [3, 5] | 0 (watchpoint controller) |
| Event Type | 5-bits | [6, 10] | 0x00 through 0x03 |
| OverStall | 1-bit | [11] | |
| PC Absolute | 1-bit | [12] | |
| Reserved | 3-bits | [13, 15] | not used |
| Timestamp | 0 or 1 byte | N/A | |
| ASID | 0 or 1 byte | N/A | |

TABLE 2-continued

Instruction Address Watchpoint Trace Message
Instruction Address Watchpoint Trace Message
(3-bytes minimum, 8-bytes maximum)

| Field | Size | Header Bit Positions | Description |
|---|---|---|---|
| PC | 1, 2 or 4 bytes | N/A | |

TABLE 3

Operand Address Watchpoint Trace Message
Operand Address Watchpoint Trace Message
(11-bytes minimum, 16-bytes maximum)

| Field | Size | Header Bit Positions | Description |
|---|---|---|---|
| Message Type | 3-bits | [0, 2] | 0b010 or 0b011 |
| Source Module | 3-bits | [3, 5] | 0 (watchpoint controller) |
| Event Type | 5-bits | [6, 10] | 0x04 thru 0x05 |
| Over Stall | 1-bit | [11] | |
| PC Absolute | 1-bits | [12] | |
| Reserved | 1-bits | [13] | |
| Data Field Size | 2-bits | [14, 15] | Defines the size of the memory write operation which produced the data field of this trace message.<br>Value - Description<br>0b00 - 1 byte. The instruction which hit the watchpoint did a 1 byte write to a memory location.<br>0b01 - 2 bytes write (as above)<br>0b10 - 4 bytes (as above)<br>0b11 - 8 bytes (as above) |
| Timestamp | 0 or 1 byte | N/A | |
| ASID | 0 or 1 byte | N/A | |
| PC | 1, 2 or 4 bytes | N/A | |
| Address Data | 8 bytes | N/A | This field contains either 8-bytes of data associated with the memory write operation or the 4-byte operand address plus 4-bytes of data, depending on a value of data field in an operand address trace.<br>For example, the value of the operand address trace data field == 0, this trace message field contains 8-bytes of data and the Data_field_size field defines which bytes were actually written to memory.<br>If the value of the operand address data field == 1, this trace message field contains the absolute 4-byte operand address in bit positions [63, 32] plus the lease significant 4-bytes of the data in bit positions [31, 0]. The Data_field_size field defines the number of bytes that were actually written to memory.<br>Note that it is possible for Data_field_size = 3 (8-bytes) even through only the least-significant 4-bytes are included in the trace message. |

TABLE 4

Instruction Value Watchpoint Trace Message
Instruction Value Watchpoint Trace Message (3-bytes minimum, 16-bytes maximum)

| Field | Size | Header Bit Positions | Description |
|---|---|---|---|
| Message Type | 3-bits | [0, 2] | 0b010 or 0b011 |
| Source Module | 3-bits | [3, 5] | 0 (watchpoint controller) |
| Event Type | 5-bits | [6, 10] | 0x06 thru 0x07 |
| OverStall | 1-bit | [11] | |
| PC Absolute | 1-bits | [12] | |
| Data Field Size | 3-bits | [13, 15] | Defines the size of the destination data field of this trace message.<br>Value - Description<br>0b0xx - No data field included because the instruction which hit the watchpoint did not write to a memory location.<br>0b100 - 1 byte. The instruction which hit the watchpoint did a 1 byte write to a memory location.<br>0b101 - 2 byte write (as above)<br>0b110 - 4 byte write (as above)<br>0b111 - 8 byte write (as above) |
| Timestamp | 0 or 1 byte | N/A | |
| ASID | 0 or 1 byte | N/A | |
| PC | 1, 2 or 4 bytes | N/A | |
| Destination Data | 0, 1, 2, 4 or 8 bytes | N/A | Exists in the trace message generated by any instruction which writes to a memory location. The size of this field is determined by the Data Field Size value. |

TABLE 5

Branch Watchpoint Trace Message
Branch Watchpoint Trace Message (4-bytes minimum, 12-bytes maximum)

| Field | Size | Header Bit Positions | Description |
|---|---|---|---|
| Message Type | 3-bits | [0, 2] | 0b010 (Defined as a background trace message) |
| Source Module | 3-bits | [3, 5] | 0 (watchpoint controller) |
| Event Type | 5-bits | [6, 10] | 0x08 |
| OverStall | 1-bit | [11] | |
| SRC Absolute | 1-bits | [12] | |
| DEST Absolute | 1-bits | [13] | |
| Reserved | 2-bits | [14, 15] | |
| Timestamp | 0 or 1 byte | N/A | |
| ASID | 0 or 1 byte | N/A | |
| Source Address | 1, 2, or 4 bytes | N/A | If SRC Absolute is '0', this field is a 1-byte or 2-byte compressed address as a signed offset from the most recent PC value sent in a previous trace message (of any type).<br>If SRC Absolute is '1', this field consists of the 4-byte absolute value of the shadow PC. |
| Destn Address | 1, 2 or 4 bytes | N/A | If DEST Absolute is '0', this field is a 1-byte or 2-byte compressed address as a signed offset from the most recent PC value sent in a previous trace message (of any type).<br>If DEST Absolute is '1', this field consists of the 4-byte absolute value of the destination address for the branch. |

TABLE 6

Fast Print Watchpoint Trace Message
Fast Print Watchpoint Trace Message (15-bytes)

| Field | Size | Header Bit Positions | Description |
|---|---|---|---|
| Message Type | 3-bits | [0, 2] | 0b011 (Defined as a trigger trace message) |
| Source Module | 3-bits | [3, 5] | 0 (watchpoint controller) |
| Event Type | 5-bits | [6, 10] | 0x09 |
| OverStall | 1-bit | [11] | |
| Reserved | 4-bits | [12, 15] | |
| ASID | 1 byte | N/A | The ASID is included in the trace message. |
| PC | 4 bytes | N/A | A full PC address is always sent. |
| FPF Data | 8 bytes | N/A | The data written to the fast printf register is always a 64 bit value. |

TABLE 7

Bus Analyzer Watchpoint Trace Message
Bus Analyzer Watchpoint Trace Message
(7-bytes minimum, 20-bytes maximum)

| Field | Size | Header Bit Positions | Description |
|---|---|---|---|
| Message Type | 3-bits | [0, 2] | 0b010 or 0b011 |
| Source Module | 3-bits | [3, 5] | 1 (Bus Analyzer) |
| Event Type | 5-bits | [6, 10] | 0x00 thru 0x01 |
| Over Stall | 1-bit | [11] | Set to indicate that one or more trace messages before this one were discarded because there was no space available in the Debug Module FIFO. |
| Match Loss | 1-bits | [12] | Set to indicate that some bus cells/tokens which should have been captured were lost because the hit occurred when either: The previous, or current captured cell/token was being transferred to the Debug Module. The capture buffer was frozen. No watchpoint hit is registered for these additional bus transaction. |
| ADDR Absolute | 1-bits | [13] | |
| Reserved | 2-bits | [14, 15] | |
| Timestamp | 0 or 1 byte | N/A | |
| Source | 1-byte | N/A | |
| Destination | 1-byte | N/A | |
| Opcode | 1-byte | N/A | |
| Transaction ID | 1-byte | N/A | |
| DataMask | 0 or 1 byte | N/A | |
| Address | 1, 2, or 4 bytes | N/A | If ADDR Absolute is '0', this field is a 1-byte or 2-byte compressed address as a signed offset from the bus transaction address calculated for the previous trace message for this watchpoint. If ADDR Absolute is '1', this field consists of the 4-byte absolute value of the transaction address. |
| Transaction Data | 0 or 8 bytes | N/A | If the bus packet captured (request or response) includes data, then this field is included. The opcode is used to determine whether the trace message contains data. |

Figure 8:
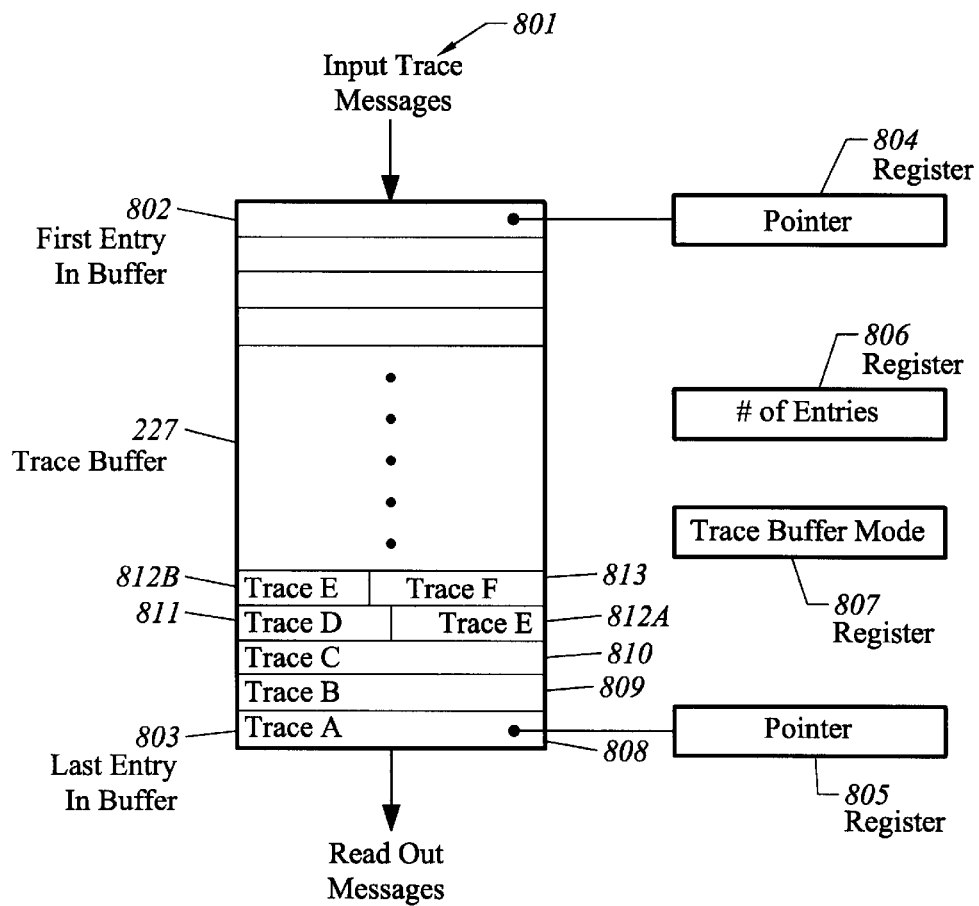
FIG. 8 is a block diagram of a trace buffer according to one embodiment of the invention.

FIG. 8 shows one embodiment of trace buffer 227. As discussed, FIFO 202 accepts one or more trace messages 801 which may be fixed size or variable length messages and provides these to trace buffer 227. Debug circuit 103 may include a number of registers 804–807 to maintain trace buffer 227. For example, circuit 103 may include a register 804 to determine a location in the trace buffer where the next trace message will be written. This area may correspond with the first entry in buffer 802. Circuit 103 may also include a register 805 which holds a pointer to the end of trace buffer 227 whereby the pointer points to the last entry in the buffer 803. Circuit 103 may include a register 806 which keeps track of the number of entries in the buffer, and a register 807 which contains the trace buffer mode. As discussed above, with reference to FIG. 5, the trace buffer may be configured to overwrite trace information or discard additional input trace messages 801. As discussed above, trace buffer 227 may include fixed length trace messages A–C (items 808–810) or variable length trace messages such as trace messages D–F (items 811, 812A, B, and 813). Trace messages may be read out of trace buffer 227 from the end of the trace buffer 227, or trace entries may be located and read out of trace buffer 227 such as through a table look-up of an index mapping the contents of trace buffer 227.

Figure 9:
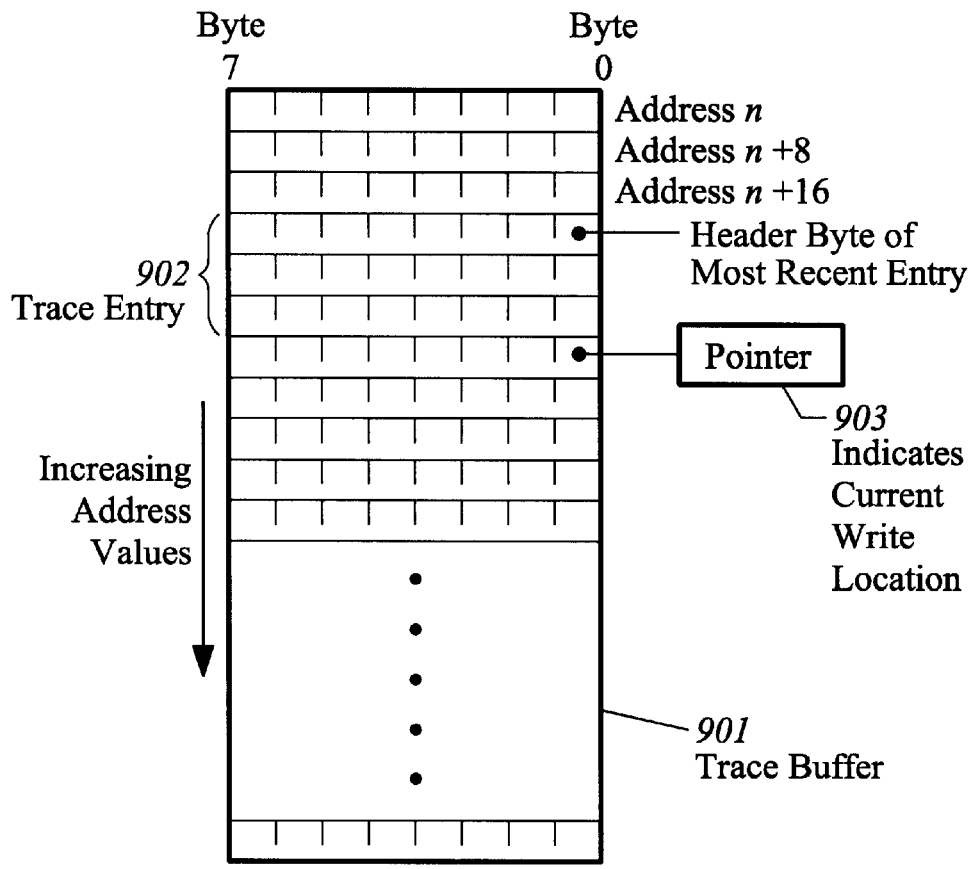
FIG. 9 is a block diagram showing one embodiment of a trace buffer.
Figure 10:
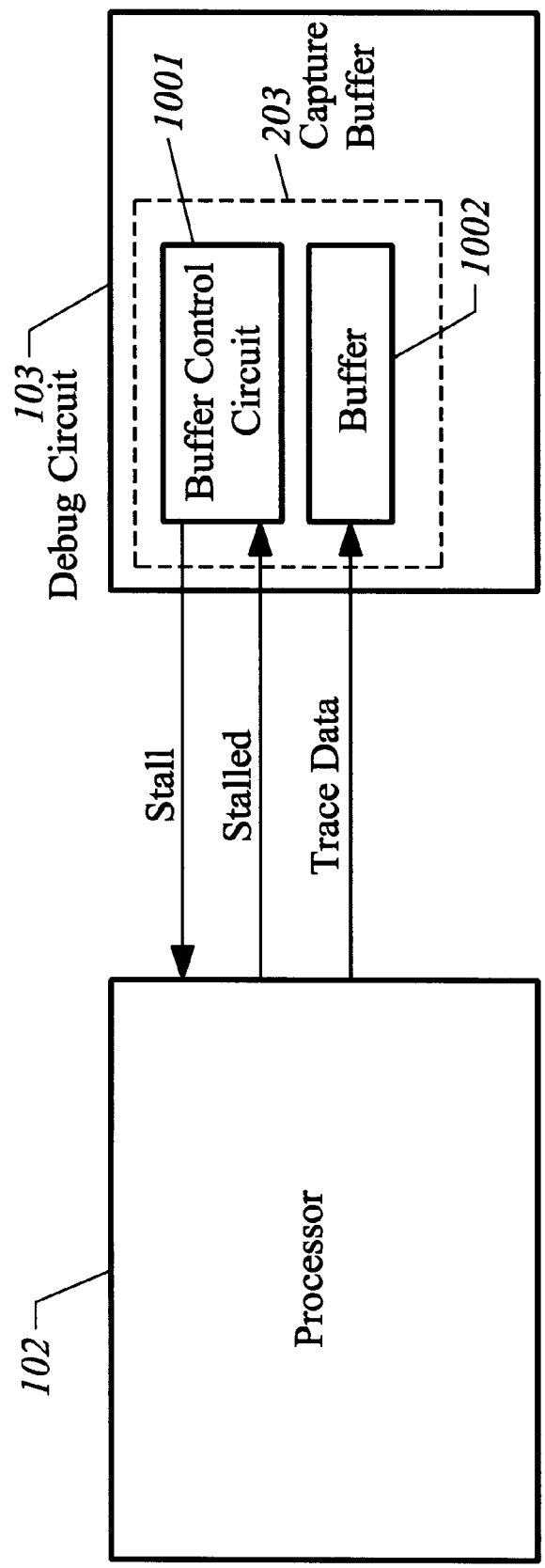
FIG. 10 shows a detailed diagram of a capture buffer.

FIG. 9 shows one embodiment of a trace buffer. Trace buffer 901 may include either variable or fixed length messages, the largest size message entry 902 fitting within 3*64-bit words. In one aspect, debug circuit 103 may write trace messages into trace buffer 901 at fixed 3*64-bit intervals. It should be understood, however, that trace information may be stored in any format, and in any number of intervals. Pointer 903 indicates the current write location for the next entry to be written in buffer 901. When extracting trace messages, debug circuit 103 should be aware of the mode of the trace buffer, such that the order of trace information may be determined. Further, the mode may determine whether address information is compressed.

Circuit 103 may include trace port registers 212 and allow debug software to read trace data from FIFO 202. For example, information may be read from FIFO 202 when the FIFO is in a trace hold mode or a circular mode. Trace data may be extracted one trace message at a time, and three registers may be used as trace port registers 212 to read out the maximum size of a trace entry, which may be, for example, less than or equal to 3*64-bits.

The three trace port registers 212 may be indirectly coupled to the FIFO. One mechanism for transferring the oldest trace message from the FIFO 202 into the trace port registers 212 may include the following sequence:

(A) Debug software provides a request to initiate transfer of the oldest trace message from the FIFO 202 to the trace port registers 212.

(B) Debug software reads an acknowledgement register until its value is 1, indicating that a transfer is complete. For example, this acknowledgement state exists until the next transfer request by the debug software.

(C) Trace data now can be read from the trace port registers 212. For example, a lower order register may be read first to determine the size of the trace message, but the registers can be read in any order and can be read any number of times.

(D) Prior to requesting another trace message transfer, debug software may determine if more trace messages exist in the FIFO 202.

As discussed, debug circuit 103 may include a capture buffer 203 which provides and receives control signals from processor 102. Capture buffer 203 may include a buffer control circuit 1001 which monitors status of buffer 1002. Buffer 1002 receives trace data from processor 102, and if buffer 1002 is full, or within a predetermined number of entries being full, buffer control circuit 1001 may indicate to processor 102 to stall an execution pipeline of the processor so as to avoid losing trace messages. In particular, buffer control circuit may exert a stall signal to processor 102 to stall the execution pipeline. In some situations, processor 102 may not stall the execution pipeline immediately upon receiving the stall signal, or may empty its execution pipeline within a finite number of processor clock cycles. In either of these situations, processor 102 may generate and transmit further trace data to debug circuit 103. Buffer control circuit may be configured to monitor buffer 1002, such that when the number of entries in the buffer exceeds a high-water mark indicating that the buffer is approaching a full condition, processor 102 may be stalled without losing any trace data that may be generated by processor 102 before the processor 102 is fully stalled. Buffer control circuit 1001 may also stall processor 102 based on a condition of FIFO 202. For example, trace processor 205 or capture buffer 203 may monitor the fullness of FIFO 202, and provide stall signals to stall processor 102 in a similar manner.

Figure 11A:
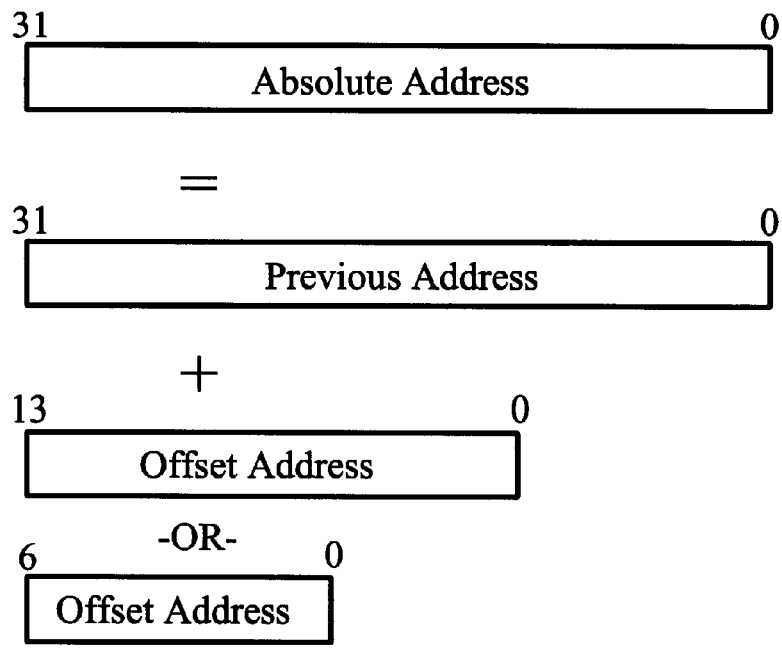
FIGS. 11A and 11B show compressed data formats in accordance with one embodiment of the invention.
Figure 11B:
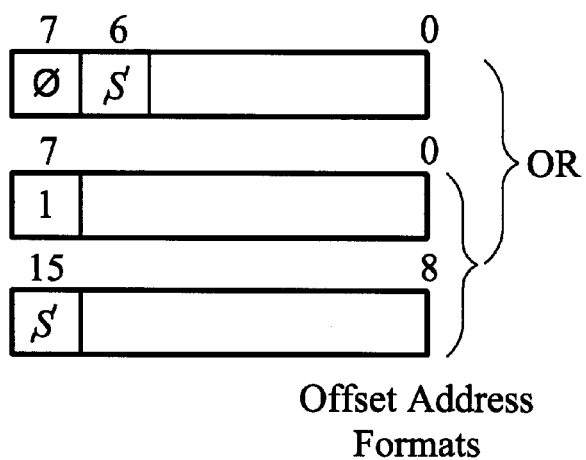

FIGS. 11A and 11B show compressed data formats in accordance with one embodiment of the invention. To minimize the size of trace messages sent over external links and to maximize storage of trace messages, trace messages may be compressed. For example, program counter addresses and bus analyzer addresses may be compressed. An encoding method may be used whereby either one or two bytes are used to represent signed address offsets of either 7- or 14-bits, these offsets being relative to the previous address of the same type. If the address cannot be expressed as a 7-bit or a 14-bit offset value, an absolute 32-bit value may be encoded instead. Offset values may not be preferred if information in a reference preceding trace message to which the offset value is relative has been lost or is otherwise unavailable. In situations where offset values are not preferred, absolute value information may be provided. For example, when FIFO 202 is operating in trace hold or circular mode wherein there exists the possibility that the reference information might be lost, overwritten, or otherwise unavailable. Further, a reference message may be provided that contain absolute value data to which offset values may be referenced. For example, when a trace message to which an offset value has been lost, debug circuit 103 may generate a reference message including an absolute value that can be used as a reference for the offset value, addresses may be encoded as absolute values.

According to one aspect of the invention, program counter addresses are encoded either as a 32-bit absolute address, or as a 7-bit or 14-bit value relative to the previous program counter address encoded in the previous trace message. Bus analyzer addresses may be encoded either as an absolute 32-bit address, or as a 7-bit or 14-bit value relative to the previous bus analyzer address encoded in the previous trace message. As shown in FIG. 11A, address offsets may be calculated as the new address minus a previous address. As shown in FIG. 11B, the addresses may be signed address offsets, the signed bit S having a value of "0" for positive address offsets. As shown in FIG. 11B, bit 7 of the first byte is used to indicate whether a second byte follows. Absolute or relative encoding of an address may be indicated by PC absolute 706 field of general trace message 701. When debug software is analyzing trace message information, it may use an absolute address as the reference for reconstructing addresses and subsequent trace messages.

A "C" programming language implementation of a compression decode routine in accordance with one embodiment of the invention such as that shown in FIGS. 11A and 11B is given below.

```
/*__DecodeCompressedOffset
pre: byteStream points to signed compressed value
post: returns decoded value
*/
int__DecodeCompressedOffset (char *byteStream)
{
int result;
if ((byteStream[0] & 128)==0) {
// the value is a 1 byte value
//
result=(byteStream[0] & 0x3F); // extract the least significant 6 bits
// check if it needs inverting
if (byteStream[0] & 64) {
result=-result;
}
} else {
// its a 2 byte value
//
// extract the least significant 7 bits
result=(byteStream[0] & 0x7F);
// additionally, extract the most significant 7 bits
result=result | ((byteStream[1] & 0x7F)<<7);
// check if it needs inverting
if (byteStream[1] & 0x40) {
result=-result;
}
}
return result;
}
```

It should be understood that other compression algorithms may be used to compress program counters, address information, and other parameters included in trace information.

As discussed above, debug circuit 103 includes a reference counter 217 which provides timestamp information. In another embodiment of the invention, a trace message includes a timestamp that represents timing information of the trace message. Timing information may be added to trace information produced by both processor 102 and bus analyzer 201. By using a single reference counter 217, both types of trace may be coherent in a single time domain. As discussed, debug circuit 103 may include a pre-scaler 216 which allows a debug user to set a timestamp increment size to suit an application that is being debugged.

According to one aspect of the invention and as discussed above with respect to FIGS. 11A and 11B, a reference message may be sent to an external system 106 in predetermined intervals, such that information may be kept current at system 106. Particularly, the reference message may indicate timing information to external system 106, such that system 106 may be apprised of the current time in debug circuit 103. Also, relative timing information in trace messages following the reference message may be calculated from the reference message timing information. Further, the reference message may include a copy of the program counter value stored in debug circuit 103, such that relative program counter information in trace messages following the reference message may be calculated from the reference message program counter value. Further, address information may also be included in the reference message for the purpose of calculating offset addresses. The timing information program counter, and address information may be absolute values.

Also, a reference message may be sent to external system 106 during continuous idle periods greater than a predetermined number of time intervals. For example, a predetermined time interval may be 256 time intervals. That is, if a transmission circuit 215 has been idle for more than 256 intervals prior to sending a trace message, a reference message may be inserted into FIFO 202 before the next trace message.

Table 8 below shows one embodiment of format and content of a reference message:

TABLE 7

Reference Message
Reference Message (14-bytes)

| Field | Size | Header Bit Positions | Description |
|---|---|---|---|
| Message Type | 3-bits | [0, 2] | 0b100 |
| Reserved | 5-bits | [3, 7] | |
| Time Value | 5-bytes | N/A | The value of the 40-bit timestamp counter in the Debug Module. |
| PC Address | 4-bytes | | The absolute 4-byte address of the shadow program counter at the time this message is generated. This address becomes the new reference PC value and the relative address in a trace message which follows will be based on this value. |
| BA Address | 4-bytes | | The absolute 4-byte reference address associated with the SuperHyway bus analyzer. This value becomes the new bus analyzer reference address and the relative address in a bus analyzer trace message which follows will be based on this value. |

As discussed above, debug circuit 103 may include a register which determines whether timestamps are included in trace messages. If included, the timestamp field 708 of FIG. 7 may be used to specify a time difference from the last reference message. Alternatively, timestamp field 708 may contain an absolute value of a timestamp.

While various embodiments of the present invention have been described above, it should be understood that they have been presented by way of example only, and not limitation. Thus, the breadth and scope of the present invention are not limited by any of the above exemplary embodiments, but are defined only in accordance with the following claims and their equivalents.

What is claimed is:

1. An integrated circuit comprising:
   at least one processor; and
   a debug module operatively connected to the processor, the debug module including a first-in-first-out (FIFO) buffer wherein the debug module is configurable to store trace information produced by the processor, and wherein the FIFO includes a plurality of memory-mapped registers configured to hold the trace information to enable reading of the trace information using the processor.

2. The integrated circuit according to claim 1, wherein the FIFO operates in a mode wherein trace information is discarded when the FIFO buffer is full.

3. The integrated circuit according to claim 1, wherein the debug module provides an indication to the processor that the FIFO is approaching a full level.

4. The integrated circuit according to claim 1, wherein the debug module provides an indication to an external system that the FIFO is approaching a full level.

5. The integrated circuit according to claim 2, wherein the debug module provides the indication within a finite number of storage locations from the full level of the FIFO.

6. The integrated circuit according to claim 1, wherein the memory-mapped registers are read by a read circuit independent from the processor.

7. The integrated circuit according to claim 1, the integrated circuit further comprising a system bus and wherein trace information is transmitted over a communication link separate from the system bus.

8. The integrated circuit according to claim 1, wherein the trace information comprises at least one of:
   program counter information;
   process identification information;
   address information;
   information stored in memory; and
   information related to a system bus transaction.

9. The integrated circuit according to claim 1, wherein the trace information is store in a RAM-based storage unit.

10. The integrated circuit according to claim 1, wherein the trace information is stored in both a RAM-based FIFO and the FIFO buffer.

11. An integrated circuit comprising:
    at least one processor; and
    a debug module operatively connected to the processor, the debug module including means for storing trace information produced by the processor, and wherein the means for storing includes a plurality of memory-mapped registers configured to hold the trace information to enable reading of the trace information using the processor.

12. The integrated circuit according to claim 11, wherein the means for storing operates in a mode wherein trace information is discarded when the means for storing is full.

13. The integrated circuit according to claim 11, wherein the debug module includes means for providing an indication to the processor that the means for storing is approaching a full level.

14. The integrated circuit according to claim 11, wherein the debug module includes means for providing an indication to an external system that the means for storing is approaching a full level.

15. The integrated circuit according to claim 12, wherein the debug module includes means for providing the indication within a finite number of storage locations from the full level of the means for storing.

16. The integrated circuit according to claim 11, wherein the memory-mapped registers are read by a read circuit independent from the processor.

17. The integrated circuit according to claim 11, the integrated circuit further comprising a system bus and wherein trace information is transmitted over a communication link separate from the system bus.

18. The integrated circuit according to claim 11, wherein the trace information comprises at least one of:

program counter information;

process identification information;

address information;

information stored in memory; and information related to a system bus transaction.

19. The integrated circuit according to claim 11, wherein the means for storing comprises a RAM-based storage unit.

20. The integrated circuit according to claim 11, wherein the means for storing comprises both a RAM-based FIFO and a FIFO buffer.

21. The integrated circuit according to claim 11 wherein the means for storing comprises a FIFO buffer.

22. An integrated circuit, comprising:

a first processor;

a debug circuit coupled to the first processor, the debug circuit including a trace processor to receive trace data from the first processor and process the trace data;

a storage coupled to the trace processor and configured to store the processed trace data;

a capture buffer to receive the trace data from the first processor and transmit the trace data to the trace processor; and a reference counter coupled to the trace processor and provide timing information to the trace processor to enable the trace processor to generate timestamp information.

23. The integrated circuit of claim 22, wherein the trace data is compressed by the trace processor prior to storing in the storage.

24. The integrated circuit of claim 23, wherein the storage is a first-in-first-out (FIFO) buffer including memory mapped registers configured to enable reading of the processed trace data using the first processor.

25. The integrated circuit of claim 24, wherein the debug circuit further comprises:

a transmission circuit coupled to an external system and configured to transmit the processed trace data to the external system;

a memory circuit to store the processed trace data; and a destination selector coupled to the FIFO buffer, the transmission circuit, and the memory circuit, the destination selector being programmable to send the processed trace data to the transmission circuit or the memory circuit.

26. The integrated circuit of claim 22, wherein the debug circuit further comprises a state processor to control the debug circuit.

* * * * *